United States Patent [19]

Woods

[11] 3,937,195

[45] Feb. 10, 1976

[54] CONSTANT MASS AIR-FUEL RATIO FLUIDIC FUEL-INJECTION SYSTEM

[75] Inventor: Robert L. Woods, Kensington, Md.

[73] Assignee: The United States of America as represented by the Secretary of the Army, Washington, D.C.

[22] Filed: Aug. 26, 1974

[21] Appl. No.: 500,838

[52] U.S. Cl. .. 123/119 R; 73/194 M; 123/139 AW; 123/DIG. 10; 137/810; 261/DIG. 69

[51] Int. Cl.[2] ...................... F02M 59/10; G01F 1/32

[58] Field of Search... 123/139 AW, DIG. 10, 119 R; 261/DIG. 69, 36 A, 39 A, 69 R; 73/194 B, 205 D, 194 C, 194 M; 137/808, 810

[56] References Cited

UNITED STATES PATENTS

| | | | |
|---|---|---|---|
| 3,548,794 | 12/1970 | Lazar | 123/119 R |
| 3,556,063 | 1/1971 | Tuzson | 123/139 AW X |
| 3,687,121 | 8/1972 | Tuzson | 123/DIG. 10 X |
| 3,722,275 | 3/1973 | Rodely et al. | 73/194 B |
| 3,766,897 | 10/1973 | Husted | 123/DIG. 10 X |
| 3,794,005 | 2/1974 | Turek | 123/119 R |
| 3,796,095 | 3/1974 | Fussell, Jr. | 73/194 B |
| 3,799,206 | 3/1974 | Matsui et al. | 123/119 R X |
| 3,818,877 | 6/1974 | Barrera et al. | 123/32 EA |
| R27,087 | 3/1971 | Binder | 261/DIG. 69 X |

OTHER PUBLICATIONS

Control Engineering Article, "Fluid Amplifier Measures Flow Velocity", by J. T. Sharpsteen, Jan. 1966, p. 103.

*Primary Examiner*—Charles J. Myhre
*Assistant Examiner*—Tony Argenbright
*Attorney, Agent, or Firm*—Nathan Edelberg; Robert P. Gibson; Saul Elbaum

[57] ABSTRACT

A fluidic implementation of a constant mass airfuel ratio fuel-injection system which may be utilized, for example, in an internal combustion engine. The system includes a fluidic mass air flow sensor that produces a pressure oscillation in direct proportion to the mass air flow to the engine. The frequency of this oscillation is utilized to control a fuel flow metering device which delivers a fixed amount of fuel per oscillation cycle. In one preferred embodiment, the metering device may comprise a fixed displacement piston pump. In an alternative embodiment, the metering device comprises a constant pulse-width fluidic amplifier.

9 Claims, 2 Drawing Figures

FIG. 1
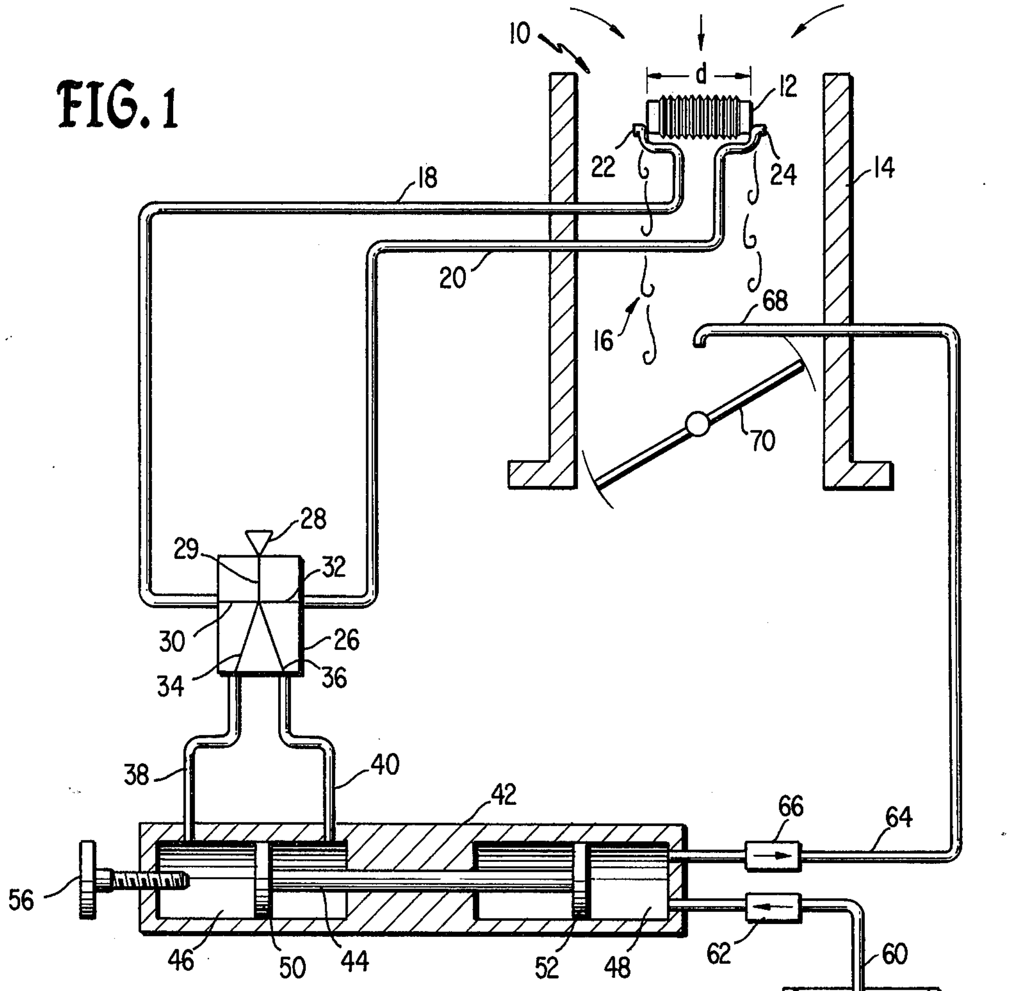
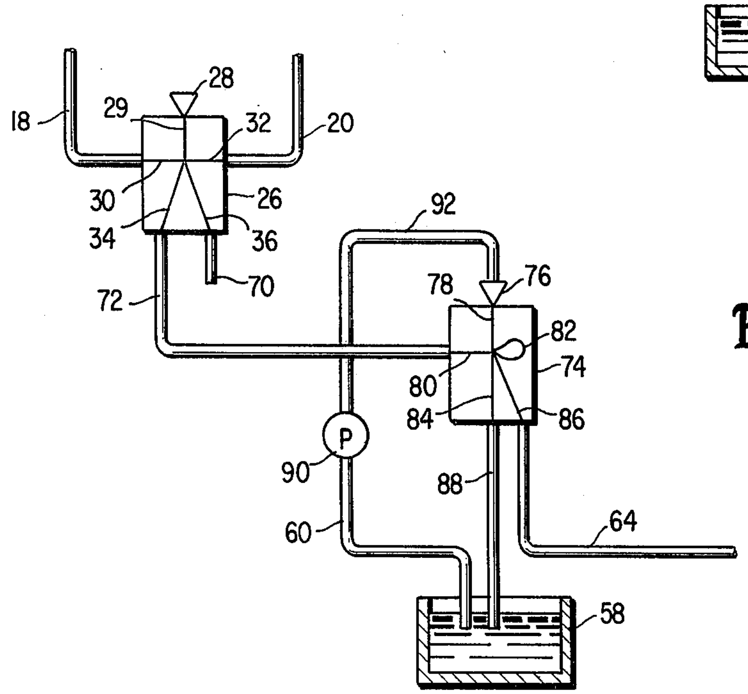
FIG. 2

CONSTANT MASS AIR-FUEL RATIO FLUIDIC FUEL-INJECTION SYSTEM

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention is related to a fluidic fuel control system and, more particularly, to a constant mass air-fuel ratio fluidic fuel-injection system for use with internal combustion engines.

2. Description of the Prior Art

The art of fluidics has long been recognized as a natural technology for the sensing, computing, and controlling functions with respect to fuel and air flow to internal combustion engines. Prior art fluidic fuel control systems have ranged from carburetor enhancement type systems through complete pulse-width modulated all fluidic type systems. The carburetor enhancement devices utilize fluid amplifiers to improve the carburetor operation by linearizing or enhancing weak venturi signals, as exemplified by U.S. Pat. Nos. 3,656,736; 3,406,951; and 3,477,699. Continuous fuel-injection systems in which the number and location of injection points are not fixed as in carburetion systems are exemplified by prior U.S. Pat. Nos. 3,389,894; 3,679,185; and 3,690,625. The latter type continuous fuel-injection systems are, however, quite similar to the carburetor, in that venturi vacuum (and manifold vacuum) determines the amount of fuel to be delivered in a continuous manner. Such fuel-injection systems experience several problems among which are the vaporization of fuel having high velocity in the power jets of the fluid amplifiers, noise, and inadequate scheduling accuracy. To obtain the desired air-fuel schedule, the fluid amplifier must have a square root singlesided transfer characteristic that results in a slight leaning of the fuel-air mixture in the mid-range region, which function is quite difficult to obtain fluidically.

Pulsed fuel-injection systems have also been proposed and are exemplified by prior U.S. Pat. Nos. 3,672,339; 3,687,121; and 3,718,151. In such pulse-width modulation systems, the pulse frequency is directly proportional to the engine speed and the pulse width (at constant pressure) is modulated to vary the fuel consumption.

An air-modulation system has also been proposed, as exemplified by my prior U.S. Pat. No. 3,771,504, in which the operator controls the fuel consumption directly, while a control system adjusts the air consumption in a prescheduled closed-loop system.

In many of the fuel management systems described above, it is desirable to maintain a constant mass air-fuel ratio. This is inherently difficult to achieve since the basic measurement of airflow is generally on a volumetric basis, which must then be compensated for air-density variations due to barometric pressure and ambient temperature. Accordingly, prior art systems which have attempted to maintain a constant mass air-fuel ratio have required rather complex apparatus including pressure sensors, temperature sensors, and computation functions to arrive at a mass airflow measurement.

OBJECTS AND SUMMARY OF THE INVENTION

It is therefore a primary object of the present invention to provide a fuel management system which is able to maintain a constant mass air-fuel ratio in an extremely simple, straightforward, and unique manner.

Another object of the present invention is to provide a novel and unique constant mass air-fuel ratio fluidic fuel-injection system.

An additional object of the present invention is to provide a novel fluidic fuel-injection system which incorporates a simple device which is inherently compensated to measure mass air flow.

The foregoing and other objects are attained in accordance with one aspect of the present invention through the provision of a constant mass air-fuel ratio fuel-injection system for internal conbustion engines which comprises a fluidic mass airflow sensor in the form of a bluff body placed across an intake port of the engine. The dimension of the bluff body across the intake port is designed to be inversely proportional to the air density. This produces pressure oscillations in the form of von Karman vortices which have a frequency directly proportional to the mass airflow past the bluff body. Means are provided which are responsive to the pressure oscillations for delivering a constant amount of fuel from a fuel source to the engine per oscillation cycle. The metering device may comprise a fixed displacement piston pump arrangement or a constant pulse-width fluidic amplifier.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a schematic diagram of one preferred embodiment of the fluidic fuel injection system of the present invention; and FIG. 2 is a schematic diagram of components which, along with those depicted in FIG. 1, illustrate a second and alternative embodiment of the present invention.

DETAILED DESCRIPTION OF THE PREFERRED EMBODIMENTS

The present invention is directed toward a fuel management system in which a constant mass air-fuel ratio may be obtained by the utilization of a recently developed flow sensor which may be inherently compensated to measure mass air flow. Such a flow sensor, or flow meter, operates on the well-known principle of the von Karmon vortex oscillations which result from fluid flow past a bluff body of a dimension $d$ in a flow of velocity $V$. The frequency of such oscillations may be described by the following equation:

$$f = S(V/d) \qquad (1)$$

where $S$ = Strouhal number = 0.212 for $500 < R < 10,000$ $R$ = Reynolds number = $Vd/\nu$ $\nu$ = kinematic viscosity = 15 centistokes (see, for example, Morkovin, M. W., "Flow Around a Circular Cylinder — A Kaleidoscope of Challenging Fluid Phenomena." *ASME Symposium on Fully Separated Flows*, May 1964)

Thus, it is seen from equation (1) above that the frequency of oscillation is directly proportional to the velocity of the flow field past the bluff body of dimension $d$. Since the volume flow rate $Q$ is equal to the product of the velocity V times the area of the input duct, for a given configuration the oscillation frequency $f$ is seen to be directly proportional to the volume flow rate, or:

$$f \propto Q/d \tag{2}$$

Since the mass airflow rate $m$ is the product of the air density $\rho$ and the volume flow rate $Q$, the oscillation frequency $f$ can be made to measure mass flow if the body dimension $d$ is made to vary inversely with $\rho$, or:

$$d \propto 1/\rho \tag{3}$$

The dimension $d$ of the bluff body can be made to vary inversely with the air density by the utilization of an encapsulated volume $v$, such as may be provided by an enclosed bellows having an end area $A$. Application of the perfect gas law yields:

$$v = Ad = MRT/P \tag{4}$$

wherein $T$ is the temperature; $P$ is the pressure; $R$ is a gas constant; and $M$ is the encapsulated mass of air. Accordingly, $$d = \frac{MRT}{AP} \propto \frac{1}{\rho} \tag{5}$$

Utilizing this result, it is seen that the dimension of the bluff body changes as an inverse function of air density and, from equation (2) above, it can be seen that the frequency of oscillation $f$ is directly proportional to the mass air flow $\dot{m}$ or:

$$f \propto \rho Q = \dot{m} \tag{6}$$

Such a flow meter whose dimension varies as a function of air density enables the mass airflow rate to be measured directly, thereby obviating the prior art requirement in a fluidic fuel injection system of pressure sensors, temperature sensors, computing apparatus, and the like.

Referring now to FIG. 1, a preferred embodiment of the fluidic fuel injection system of the present invention is illustrated in which a bellows 12 having a dimension d is shown positioned across the intake port 10 of a throttle body 14 of a conventional internal combustion engine. A pair of oscillation sensing ports 22 and 24 are placed on either side of the bluff body 12 to pick up the pressure oscillations created by the von Karmon vortices 16. Sensing ports 22 and 24 are respectively connected via conduits 18 and 20 to the input channels 30 and 32 of a bistable fluid amplifier 26. Fluid amplifier 26 includes a power input line 29 which may be conventionally connected to a power source 28 which may comprise, for example, compressed air. Amplifier 26 is further provided with a pair of output channels 34 and 36 which feed the bistable output thereof via conduits 38 and 40 to a first chamber 46 of a positive displacement piston type pump 42. Within chamber 46 is disposed a first piston head 50 which is rigidly connected via a rod 44 to a second piston head 52 positioned within the second chamber 48. Communicating as an inlet to chamber 48 is a conduit 60 adapted to receive fuel from fuel tank 58 and deliver same to chamber 48 via a one-way valve 62. The output fuel from chamber 48 is communicated via another one-way valve 66 through a conduit 64 to the output fuel injection nozzle 68 fixedly positioned within throttle body 14. The admixture of air and injected fuel within throttle body 14 is conventionally controlled by means of a butterfly valve 70.

In operation, since the flowmeter 12 produces pressure oscillations having a frequency proportional to the mass airflow (see equation [6] above), it is seen to be desirable to deliver a constant mass or volume $C$ of fuel each cycle of the air flowmeter, i.e.:

$$C = \frac{\text{mass of fuel}}{\text{cycle of oscillation}} \tag{7}$$

Thus, for each oscillatory pulse generated by flowmeter 12, a fixed mass of fuel is injected into the engine. Since the fuel mass flow rate $F$ may be given by the product of the mass per cycle and the cycles per second, i.e.:

$$F = Cf \tag{8}$$

and since the frequency $f$ of flowmeter 12 is directly proportional to the mass airflow $\dot{m}$, the fuel injected can been seen to be directly proportional to $\dot{m}$ to thereby maintain a constant mass air-fuel ratio to the engine. That is, $$F \propto C\dot{m}\text{, or} \tag{9}$$

$$\dot{m}/F = \text{constant} \tag{10}$$

Thus, according to the preferred embodiment seen in FIG. 1, the pressure oscillations generated by flowmeter 12 are amplified by fluid amplifier 26 and fed to chamber 46 of pump 42 to drive head 50 at a frequency directly proportional to the mass airflow. Accordingly, fuel from reservoir 58 will be alternately sucked and expelled from chamber 48 and consequently injected via fuel injection nozzle 68 at a constant volume per cycle. For each pulse or oscillation generated by flow meter 12, a given amount of fuel will be delivered to fuel injection nozzle 68, and as the pulse or oscillation frequency increases, the total fuel flow will increase. Thus, a constant mass of fuel will be delivered for each cycle of the flowmeter thereby maintaining a constant mass air-fuel ratio to the engine, as verified by equations (9) and (10) above. Since the density of liquid fuel is relatively independent of temperature, mass compensation would not be required. Pump 42 may be provided with a variable adjusting means 56 to provide an adjustable or variable limit of travel for head 50 to permit adjustment of the overall air-fuel ratio. If a gaseous fuel was desired to be utilized, such limits, or the volume per cycle, may be varied in accordance with the gas density.

FIG. 2 illustrates an alternative embodiment of the fuel injection system according to the present invention, which, in contradistinction to the first embodiment, requires no moving parts. As in the embodiment of FIG. 1, the pressure oscillations are sensed and fed via conduits 18 and 20 to a bistable amplifier 26 which has an output channel 36 shorted as by conduit 70 so as to be configured as a pulse shaper to provide a square wave output signal at its other output channel 34. The output from channel 34 of amplifier 26 is fed via conduit 72 to the input channel 80 of a constant pulse width monostable amplifier 74. Monostable amplifier 74 is fuel powered via fuel reservoir 58, conduit 60, fuel pump 90, conduit 92, and input power nozzle 76. Monostable amplifier 74 includes an internal feedback loop 82 which normally biases the power fuel input along conduit 78 to output conduit 84 which feeds back to reservoir 58 via conduit 88. As is well known in the art, when a pulse is received at control channel 80, the power fuel input from channel 78 is switched to output channel 86 which feeds to conduit 64 and subsequently to the fuel injection nozzle 68. A predetermined time delay thereafter, the output switches back to output channel 84 to exhaust via conduit 88 to tank 58. The well-known characteristics of one-shot or monostable amplifier 74 are such that regardless of the frequency of the input pulses received at control channel 80, the output pulses delivered at output channel 86 will be of a constant duration. The pulse width of the output at channel 68 is determined by the particular design of the feedback loop 82, while the pulse height (fuel flow) is determined by the supply pressure at input 76. The pulse width and height together determine the fuel injected per cycle of oscillation from the flow meter. The constant pulse width output metered from amplifier 74 provides a constant volume of fuel per cycle to fuel injection nozzle 68.

It is seen by virtue of the foregoing that I have provided an extremely simple fluidic implementation of a constant mass air-fuel ratio fuel-injection system. The system utilizes, in both embodiments, a fluidic mass airflow sensor that produces a pressure oscillation in direct proportion to the mass airflow to the engine. While the main application of the present invention may be envisioned to be for automotive type engines, the present invention may also be utilized in the control of any combustion process in which air and fuel flows must be coordinated. If it were desirable to schedule the air-fuel ratio as a function of engine loading, it would be a straightforward matter to vary the fuel injected per cycle to modify the air-fuel ratio. The present invention may be classified as a fuel-modulation or fuel-metering system and is applicable to either liquid fuels (such as gasoline) or to gaseous fuels (such as natural gas, butane or propane, or hydrogen). The advantages of the present invention include positive fuel metering with utter simplicity and no moving parts.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In an internal combustion engine having an intake port, the improvement which comprises a constant mass air-fuel ratio fuel-injection system which comprises:

fluidic mass air flow sensor means for producing pressure oscillations in direct proportion to the mass air flow to said engine;

a source of fuel; and means responsive to said pressure oscillations for delivering a constant amount of fuel from said source to said engine per oscillation cycle.

2. The system according to claim 1, wherein said fluidic sensor means comprises a bluff body positioned across said intake port of said engine, the dimension of said bluff body across said intake port being inversely proportional to the air density.

3. The system according to claim 2, wherein said means responsive to said pressure oscillations includes a pair of oscillation sensing ports placed adjacent the respective ends of said bluff body, whereby the pressure oscillations due to the von Karmon vortices shed from said bluff body may be sensed by said pair of oscillation sensing ports.

4. The system according to claim 3, wherein said means responsive to said pressure oscillations further includes a bistable fluidic amplifier whose inputs are connected to receive the outputs from said pair of oscillation sensing ports.

5. The system according to claim 4, wherein said means responsive to said pressure oscillations further includes positive displacement pump means responsive to the oscillatory output from said bistable fluidic amplifier for delivering constant volume of fuel from said source to said engine per cycle of said amplifier.

6. The system according to claim 5, wherein said pump means comprises a piston which includes a rod having a pair of heads fixedly secured to the respective ends thereof; a first chamber connected to receive the output from said fluidic amplifier and in which one of said heads is reciprocally movable in response to said oscillatory output from said amplifier; a second chamber in which the other of said heads is positioned, said source of fuel connected to said second chamber; and output conduit means connected to said second chamber for receiving fuel drawn from said source by the reciprocation of said second head and for delivering said drawn fuel to said engine.

7. The system according to claim 4, wherein said means responsive to said pressure oscillations further includes one-shot flueric amplifier means responsive to a square-wave output from said fluidic amplifier for producing a constant pulse width output.

8. The system according to claim 7, wherein said flueric amplifier means includes a power fluid input connected to said source of fuel and an output connected to said engine, whereby said constant pulse width output thereof provides a constant volume of fuel to said engine per cycle of the square wave output from said fluidic amplifier.

9. The system according to claim 6, wherein said first chamber include means for limiting the travel of the head disposed therein whereby the air-fuel ratio to said engine may be controlled.

* * * * *